(12) United States Patent
Dai

(10) Patent No.: US 8,221,937 B2
(45) Date of Patent: Jul. 17, 2012

(54) METAL-FREE VERTICALLY-ALIGNED NITROGEN-DOPED CARBON NANOTUBE CATALYST FOR FUEL CELL CATHODES

(75) Inventor: Liming Dai, Beavercreek, OH (US)

(73) Assignee: University of Dayton, Dayton, OH (US)

( * ) Notice: Subject to any disclaimer, the term of this patent is extended or adjusted under 35 U.S.C. 154(b) by 398 days.

(21) Appl. No.: 12/642,059

(22) Filed: Dec. 18, 2009

(65) Prior Publication Data

US 2010/0183950 A1 Jul. 22, 2010

Related U.S. Application Data

(60) Provisional application No. 61/138,982, filed on Dec. 19, 2008.

(51) Int. Cl.
*H01M 4/90* (2006.01)
*H01M 8/00* (2006.01)

(52) U.S. Cl. .......... 429/513; 429/523; 429/535

(58) Field of Classification Search ........... 429/513, 429/523, 535; 216/13; 977/742, 744
See application file for complete search history.

(56) References Cited

U.S. PATENT DOCUMENTS

| | | | |
|---|---|---|---|
| 6,485,858 B1 * | 11/2002 | Baker et al. ........... | 429/524 |
| 6,808,746 B1 * | 10/2004 | Dai et al. ........... | 427/249.1 |
| 6,866,801 B1 * | 3/2005 | Mau et al. ........... | 264/29.1 |
| 7,147,966 B2 * | 12/2006 | Ren et al. ........... | 977/742 |
| 7,442,284 B2 * | 10/2008 | Ren et al. ........... | 205/159 |
| 7,718,230 B2 * | 5/2010 | Zakhidov et al. ......... | 427/474 |
| 7,758,921 B2 * | 7/2010 | Liu et al. ........... | 427/249.1 |
| 7,767,616 B2 * | 8/2010 | Liu et al. ........... | 977/744 |
| 7,799,163 B1 * | 9/2010 | Mau et al. ........... | 156/247 |
| 7,927,748 B2 * | 4/2011 | Liu et al. ........... | 429/523 |
| 2004/0149209 A1 | 8/2004 | Dai et al. | |
| 2004/0197638 A1 * | 10/2004 | McElrath et al. ........... | 429/44 |
| 2009/0246625 A1 * | 10/2009 | Lu ........... | 429/207 |

FOREIGN PATENT DOCUMENTS

WO 00/73204 A1 12/2000

OTHER PUBLICATIONS

Kaunping Gong, et al.; Nitrogen-Doped Carbon Nanotube Arrays with High Electrocatalytic Activity for Oxygen Reduction; SCIENCE; Feb. 6, 2009; pp. 760-764.

* cited by examiner

*Primary Examiner* — Helene Klemanski
(74) *Attorney, Agent, or Firm* — Dinsmore & Shohl, LLP

(57) ABSTRACT

Metal-free fuel cell cathodes having a catalytic layer of vertically-aligned, nitrogen-doped carbon nanotubes (VA-NCNTs) are provided. The fuel cell cathodes comprise a cathode body, a binder layer attached to an outer surface of the cathode body, and the catalytic layer, which is supported by the binder layer. The binder layer may comprise a composite of a conductive polymer and doped or undoped nonaligned carbon nanotubes. In a method for forming the fuel cell cathodes, the VA-NCNTs may be formed by pyrolysis of a metalorganic compound and integration of the nanotubes with nitrogen. The binder layer is applied, and the resulting supported nanotube array may be attached to the cathode body. Fuel cells comprising the fuel cell cathodes are provided. The fuel cell cathodes comprising VA-NCNTs demonstrate superior oxygen-reduction reaction performance, including for electrocatalytic activity, operational stability, tolerance to crossover effects, and resistance to CO poisoning.

20 Claims, 4 Drawing Sheets

METAL-FREE VERTICALLY-ALIGNED NITROGEN-DOPED CARBON NANOTUBE CATALYST FOR FUEL CELL CATHODES

CROSS-REFERENCE TO RELATED APPLICATIONS

This application claims the benefit of priority under 35 U.S.C. §119(e) of U.S. Provisional Application Ser. No. 61/138,982, filed Dec. 19, 2008.

TECHNICAL FIELD

The present disclosure generally relates to fuel cells and, more particularly, to metal-free carbon nanotubes for use as cathode electrodes in fuel cells.

BACKGROUND

A fuel cell is based on an electrochemical cell, wherein two electrodes are in electrical contact with one or more electrolytes that can be solids or liquids. An electrically insulating, ion-permeable membrane may also be situated within the electrolyte. Because the membrane is electrically insulating, electrons formed at the anode are forced to travel through an external circuit back to the cathode to maintain the cathode reaction. Between the anode and the cathode, the electrons can be used to supply power to devices connected to the external circuit or can be fed into an energy storage system such as a battery.

The electrochemical reaction within a fuel cell generates environmentally benign products of electricity, water, and heat from an oxidant source such as oxygen and a fuel source such as, for example, hydrogen. As one specific example, in an alkaline hydrogen fuel cell, oxygen is passed over the cathode to be reduced, and hydrogen is passed over the anode to be oxidized. This oxidation-reduction may occur by several different pathways, depending on the chosen electrolyte and membrane. In an alkaline electrolyte with a hydroxyl-permeable membrane, for example, intermediate hydroxyl ions flow from the cathode, through the membrane, to the anode to be combined with hydrogen. Such an oxidation-reduction may occur through a "four-electron pathway" according to the following reactions:

Cathode side half-reaction (alkaline electrolyte): $O_2+2H_2O+4e^-\rightarrow 4OH^-$ Anode side half-reaction (alkaline electrolyte): $2H_2+4OH^-\rightarrow 4H_2O+4e^-$ Net reaction: $2H_2+O_2\rightarrow 2H_2O$ A less efficient, "two-electron pathway" also is possible, whereby peroxide ions are formed instead of hydroxyl ions, resulting in one part $H_2O_2$ as the final product of a net reaction between one part $H_2$ and one part $O_2$. Also known are fuel cells using acidic electrolytes with cation-permeable membranes, such that intermediate ions (protons) flow from the anode, through the electrolyte, to the cathode to be combined with oxygen. An example four-electron pathway in a hydrogen fuel cell with acidic electrolyte involves the following reactions:

Cathode side half-reaction (acidic electrolyte): $O_2+4e^-\rightarrow 2O^{2-}$

Anode side half-reaction (acidic electrolyte): $2H_2\rightarrow 4H^++4e^-$

Net reaction: $2H_2+O_2\rightarrow 4H^++2O^{2-}\rightarrow 2H_2O$

The reactions applicable to a hydrogen fuel cell are shown for their relative simplicity. Other fuels and oxidants can be employed in fuel cells, for example, alcohols such as methanol, or complex molecules such as glucose or other sugars. Regardless of the fuel, in any fuel cell employing one of the above four-electron pathways with an oxidant comprising oxygen, the cathode side half-reaction is known as an oxygen-reduction reaction (ORR). Thermodynamics and kinetics of the ORR typically require a cathode catalyst to ensure technically useful output of the fuel cell. Common catalysts for the oxygen reduction at the cathode have included expensive platinum-group metals or alloys.

An efficient catalyst for the ORR at the cathode is essential for practical applications of fuel cell technology. Some of the pioneering work in alkaline fuel cells were for the highly customized and one-time needs of the Apollo Space Program. These alkaline fuel cells included a four-electron ORR catalyzed with platinum-loaded carbon (Pt—C) catalysts. But in general, the use of high-cost noble metal catalysts such as platinum has precluded large-scale commercial applications. In addition to the high costs involved, platinum electrodes in commercial fuel cells may be further limited by issues such as susceptibility of platinum electrodes to time-dependent drift and to deactivation by catalyst poisons such as carbon monoxide (CO). Recent research efforts in reducing or replacing expensive platinum electrodes in fuel cells have led to the development of various Pt-based alloys, of transition metal oxide and organic complexes, of carbon-nanotube-supported metal particles, of enzymatic electrocatalytic systems, and of conducting polymer coated membranes.

However, there remain ongoing needs for efficient ORR cathode catalysts in the development of low-cost, high-performance fuel cells.

BRIEF SUMMARY

These needs are met by the embodiments disclosed herein. According to the present disclosure, arrays of vertically-aligned nitrogen-doped carbon nanotubes (VA-NCNTs) are provided as metal-free catalytic layers for fuel cell cathodes. These metal-free catalytic layers provide for increased catalytic activity, increased long-term stability, and increased tolerance to crossover effects than oxygen-reduction cathodes comprising metals such as platinum.

In one embodiment, a fuel cell cathode comprises a cathode body, a binder layer attached to an outer surface of the cathode body, and a catalytic layer supported by the binder layer. The binder layer may comprise a composite of a conductive polymer and nonaligned carbon nanotubes. The catalytic layer comprises a plurality of vertically-aligned nitrogen-doped carbon nanotubes.

In another embodiment, a method of fabricating a fuel cell cathode comprises providing a substrate having an array of vertically-aligned nitrogen-doped carbon nanotubes bound to a surface of the substrate. A top surface of the array is coated with a binder layer comprising a composite of conductive polystyrene and nonaligned nitrogen-doped carbon nanotubes. A free surface of the binder layer is then etched to expose a portion of the nonaligned nitrogen-doped carbon nanotubes contained in the composite. Thereupon, the substrate is removed to produce a free-standing film comprising the array of vertically-aligned nitrogen-doped carbon nanotubes supported by binder layer. This free-standing film may be attached to an outer surface of a cathode body, for example a glassy carbon portion of the cathode body.

In another embodiment, a fuel cell comprises a fuel cell body, an oxidant inlet configured to fluidly couple the fuel cell body to an oxidant source, a fuel inlet configured to fluidly couple the fuel cell body to a fuel source, and an exhaust outlet. A cathode of the fuel cell according to other embodiments described herein is fluidly coupled to the oxidant inlet, and an anode of the fuel cell is fluidly coupled to the fuel inlet and the exhaust outlet. Within the fuel cell body, an electrolyte is configured to permit flow of ions between the cathode and the anode, and an electrically insulating membrane is disposed within the electrolyte and configured to block flow of electrons between the cathode and the anode through the electrolyte. An external circuit couples the anode and the cathode in isolation from the electrolyte.

Accordingly, it is a feature of the embodiments of the present disclosure to provide fuel cell cathodes comprising metal-free, efficient ORR catalysts, methods for fabricating the fuel cell cathodes, and low-cost, high-performance fuel cells comprising the cathodes. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
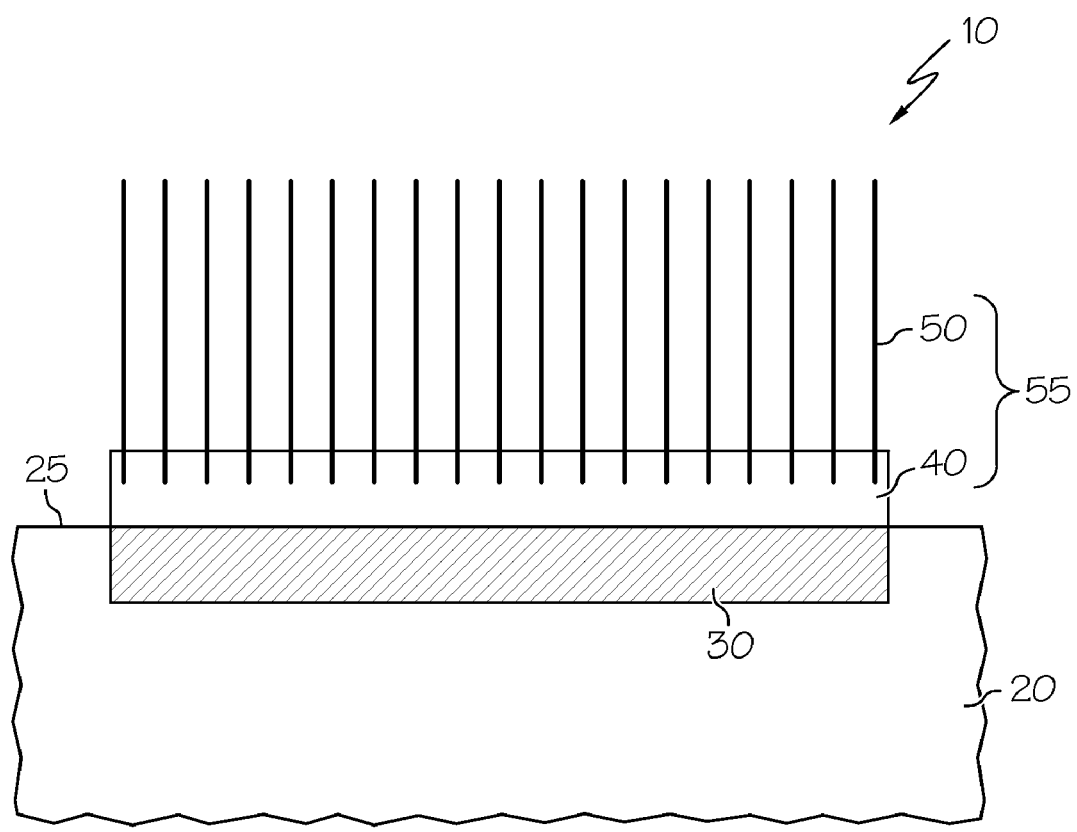
FIG. 1 is a cross-sectional plan view of one embodiment of a fuel cell cathode comprising a catalytic layer of vertically-aligned nitrogen-doped carbon nanotubes.

In the following detailed description, reference is made to the accompanying drawings that form a part of this application, and in which are shown by way of illustration, and not by way of limitation, specific embodiments in which the disclosure may be practiced. It is to be understood that other embodiments may be utilized and that logical, mechanical, and electrical changes may be made without departing from the spirit and scope of the present disclosure.

Among various non-noble-metal catalysts for the oxygen-reduction reaction (ORR), carbon nanotubes formed by high-temperature treatment of ferrocene, for example, have been demonstrated to show promising catalytic activity. This activity has been theorized to be attributed to active sites of $FeN_2$—C and/or $FeN_4$—C within the nanotubes. At such active sites, iron (Fe) may be coordinated with two or four nitrogen (N) atoms arranged in a pyridinic or a pyrrolic structure.

On the other hand, carbon nanotubes produced by pyrolysis of iron (II) phthalocyanine (FePc, a metal heterocycle molecule containing nitrogen) can be used as effective ORR electrocatalysts even after a complete removal of the residual Fe catalyst. The pyrolysis may be carried out either in the presence of and or in the absence of ammonia ($NH_3$) vapor. Moreover, the resulting nanotubes are both vertically-aligned and nitrogen-doped. As used herein, the term "vertically-aligned" means that for any plurality of carbon nanotubes, the cylindrical axes of rotation of the individual carbon nanotubes are substantially parallel to each other and are substantially perpendicular to a body supporting the individual nanotubes such as, for example, a substrate or a binder layer. As used herein, the term "nitrogen-doped" means that for any given carbon nanotube, at least a portion of the carbon sites in the graphitic structure of the carbon nanotube are filled with nitrogen atoms instead of with carbon atoms, such that the portion of carbon sites so filled with nitrogen would be detectable by common analytical means known in the art such as, for example, x-ray photoelectric spectroscopy (XPS). Hereinafter these vertically-aligned nitrogen-doped carbon nanotubes shall be referred to as VA-NCNTs.

The VA-NCNTs catalyze a four-electron ORR process in alkaline electrolytes with a much higher electrocatalytic activity, a lower overpotential (i.e., the difference between thermodynamic and formal potentials), a smaller crossover effect (i.e., decrease in activity as a result of species produced at the anode crossing over to the cathode), and an increased long-term operational stability when compared with commercially available or similar platinum electrodes (e.g., 20 wt % platinum on Vulcan XC-72R; E-TEK). Without intent to be limited by theory, the ORR at the VA-NCNT electrode is believed to take place through reduction of the positively-charged carbon (C) atoms in the nanotubes around the electron-accepting N atoms by the action of the electrochemical cycling and reoxidation of these reduced C atoms to their preferred oxidized state by adsorbed oxygen ($O_2$) molecules. Thus, the high surface area, good electrical and mechanical properties, and superb thermal stability intrinsically characteristic of carbon nanotubes can provide additional advantages for the nanotube electrode to be used in fuel cells under both ambient and harsh conditions (e.g. at elevated temperatures where other metal-free electrodes, such as polymers, fail due to thermal degradation).

Referring to FIG. 1, an example embodiment of a fuel cell cathode 10 is provided. The fuel cell cathode 10 may comprise a cathode body 20 with an outer surface 25. The cathode body 20 may have any desired shape, cross-section, or configuration and may be made of any suitable material. Thus, FIG. 1 is not intended to limit the shape of the cathode body 20, which may be tailored to any particular need. In some embodiments, the cathode body 20 may be a solid electric conductor, such as a metal, a conductive polymer, or glassy carbon. In further embodiments, the cathode body 20 may comprise a conductive or non-conductive shell (not shown) surrounding an electrically conductive core (not shown). In the embodiment shown in FIG. 1, the fuel cell cathode 10 comprises a contact portion 30 configured as a glassy carbon insert within the cathode body 20 and exposed to form part of the outer surface 25 of the cathode body 20. The contact portion 30 may be electrically coupled to the cathode body 20 itself or, if the cathode body is non-conductive, to a conductor (not shown) extending through the cathode body 20. In another embodiment not shown, the contact portion 30 may be configured as a coating of glassy carbon covering up to a substantial entirety of the outer surface 25 of the cathode body 20.

The fuel cell cathode 10 further comprises a supported nanotube array 55 attached to the contact portion 30 of the cathode body 20. FIG. 1 shows by means of illustration, not of limitation, that the supported nanotube array 55 is attached to only a portion of the outer surface 25 of the cathode body 20, in particular to the contact portion 30 configured in FIG. 1 as a glassy carbon insert that is exposed to form part of the outer surface 25 of the cathode body 20. Thus, as suitable for the desired application, the supported nanotube array 55 may be attached to a contact portion 30 covering any amount of the cathode body 20. As illustrative examples not shown, the supported nanotube array 55 may cover only a tip of a cylindrical cathode body, a surface feature of a flat cathode body such as a plate, or any amount up to a substantial entirety of a cathode body of any desired shape.

The supported nanotube array 55 comprises a binder layer 40, attached to the outer surface 25 of the cathode body 20, and a catalytic layer 50 supported by the binder layer 40. The catalytic layer 50 comprises a plurality of VA-NCNTs. As used herein, the term "supported by" means that each VA-NCNT of the plurality of VA-NCNTs have a first end physically or chemically held by, bound to, or enclosed within the binder layer 40 a second end dangling in free space above the binder layer 40 (or, as shown, vertically above). Because FIG. 1 shows only a cross-sectional plan view, it will be understood that, when viewed from above down the rotational axes of the nanotubes, the plurality of VA-NCNTs are arranged as an array of any energetically favorable configuration in the two dimensions of the outer surface 25 of the cathode body 20.

The binder layer 40 is electrically conductive and thus electrically couples the catalytic layer 50 to the cathode body 20. For example, in the embodiment shown in FIG. 1, the catalytic layer 50 is electrically coupled to the cathode body 20 through the contact portion 30 within the cathode body 20. Therefore, the binder layer 40 may comprise any electrically conductive material suitable for supporting the VA-NCNT array of the catalytic layer 50 to the cathode body 20. In one embodiment, the binder layer 40 may comprise a conductive polymer such as, for example, a polystyrene. In this sense, the term "polystyrene" is not intended to be limited to any one type of composition and may include homopolymers and copolyments of styrene. Thus, "polystyrene" refers to any polymer comprising styrene repeating units, without regard to molecular size, stereochemistry, or the presence of additional polymer units.

The binder layer 40 may further comprise non-aligned carbon nanotubes that form a composite with a conductive polymer. In an example embodiment, the binder layer may comprise a composite of a polystyrene and nonaligned carbon nanotubes. The nonaligned carbon nanotubes may comprise a graphitic structure consisting of carbon atoms, or the nonaligned carbon nanotubes may be doped. In an example embodiment, at least a portion of the nonaligned carbon nanotubes are nitrogen-doped. Without intent to be limited by theory, it is believed that the presence of nonaligned carbon nanotubes within a conductive polymer nanotube composite stabilizes the catalytic layer 50 and strengthens the bonding between the binder layer 40 and the catalytic layer 50, such as through van der Waals interactions.

Figure 2:
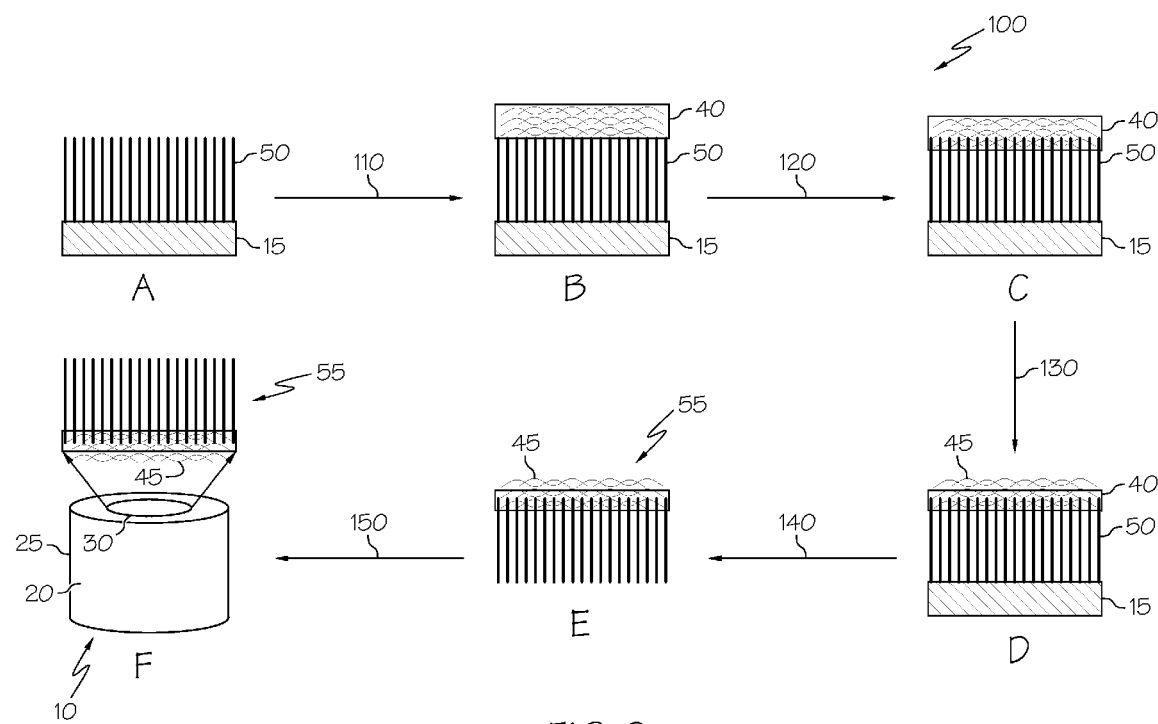
FIG. 2 is a schematic of one embodiment of a method for preparing a fuel cell cathode comprising a catalytic layer of vertically-aligned nitrogen-doped carbon nanotubes.

One example embodiment of a method for fabricating a fuel cell cathode is illustrated in FIG. 2. The example method 100 for fabricating a fuel cell cathode may comprise first providing a substrate comprising an array of vertically-aligned nitrogen-doped carbon nanotubes bound to a surface of the substrate. Such a substrate may be provided as shown in the diagram A of FIG. 2, wherein a catalytic layer 50 comprising an array of VA-NCNTs is deposited on a substrate 15. The substrate 15 may comprise any material suited for growth of carbon nanotubes thereon. In specific examples, the substrate 15 may comprise a silica ($SiO_2$) substrate, such as a quartz plate, or a silicon wafer with a native or prepared layer of $SiO_2$ thereon.

The array of VA-NCNTs may be deposited by pyrolyzing a hydrocarbon or a metalorganic compound in the presence of the substrate 15. In example embodiments, the metalorganic compound may be a sandwich compound such as, for example, ferrocene, or nitrogen-containing metal heterocycle such as, for example, an iron(II) phthalocyanine (FePc). The FePc may be substituted with one or more functional groups and may be pyrolyzed, for example, at approximately 800-1100° C. in a quartz tube furnace or other suitable vessel. When a nitrogen-containing heterocycle is pyrolyzed, a concurrent integration of nitrogen into the graphitic structure or the plurality of nanotubes occurs during the pyrolysis. Otherwise, nitrogen can be incorporated into the nanotubes, for example, by exposing the nanotubes to a nitrogen source such as ammonia gas ($NH_3$) during or after the pyrolysis. Thus, the pyrolyzing optionally can be performed in the presence of $NH_3$ gas, even when a nitrogen-containing heterocycle is pyrolyzed, and may provide a higher level of nitrogen doping to the carbon nanotubes. In one specific example, the pyrolysis may be carried out in a gas flow comprising approximately 48 vol. % Ar, approximately 28 vol. % $H_2$, and approximately 24 vol. % $NH_3$. Residual metal particles derived from the metalorganic compound optionally may be removed, such as by electrochemical oxidation. Without intent to be limited by theory, it is believed that removal of residual metal particles improves the electrochemical characteristics of the fuel cell cathode fabricated according to the above method.

By coating step 110, the binder layer 40 is coated onto the top surface of the catalytic layer 50 to result in the structure B in FIG. 2. As shown, the binder layer 40 comprises a composite of a conductive polymer, such as polystyrene, and nonaligned carbon nanotubes (NA-NCNTs), depicted as wavy lines within the binder layer 40. The binder layer 40 can be coated onto the catalytic layer 50, for example, from a toluene solution comprising about 10 wt % polystyrene and about 2.0 mg/mL carbon nanotubes. In heating step 120, the structure B in FIG. 2 may be heated up to about 140° C. for about 1 minute in air to cause a controlled infiltration of the binder layer 40 into the VA-NCNT array that makes up the catalytic layer 50. The heating effectively melts the composite material sufficiently to bind the free ends of the nanotubes in the catalytic layer 50 into the binder layer 40, to produce structure C shown in FIG. 2. Without intent to be limited by theory, it is believed that the controlled infiltration produced by heating step 120 ensures a strong adhesion between the catalytic layer 50 and the binder layer 40.

A top surface of structure C in FIG. 2 is etched in etching step 130 to form the structure D. The etching of the binder layer 40 produces exposed nonaligned nanotubes 45 at the etched surface of the binder layer 40. In one example, water-plasma etching can be used to etch the binder layer 40. In structure D of FIG. 2, the catalytic layer 50 is still connected to the substrate 15. In substrate removal step 140, the substrate 15 is removed to result in the supported nanotube array 55 shown in structure E of FIG. 2, wherein the supported nanotube array 55 is a free-standing structure having exposed nonaligned nanotubes 45 on one side. The substrate 15 can be removed, for example, by immersing at least the substrate 15 in an aqueous HF solution (for example, 1:6 v/v).

In attachment step 150, shown as structure F in FIG. 2, the supported nanotube array 55 may be attached to a contact portion 30 of an outer surface 25 of a cathode body 20 to form the fuel cell cathode 10. In example embodiments, the contact portion 30 may comprise glassy carbon. In further example embodiments, the contact portion 30 may be of any desirable size or configuration, up to covering a substantial entirety of the outer surface 25 of the cathode body 20. The supported nanotube array 55 may be attached to the contact portion 30 by contacting the exposed nonaligned nanotubes 45 of the supported nanotube array 55 to the contact portion 30. Thereby, a conductive connection is established between the supported nanotube array 55 and the cathode body 20 at the contact portion 30.

In a further step not shown, the catalytic layer 50 of the fuel cell cathode 10 prepared as described above may be purified. In one example, the purification may be carried out by electrochemically oxidizing. The electrochemical oxidation of the fuel cell cathode 10, in one example, may be carried out in an aqueous solution of $H_2SO_4$ (0.5 M) at a potential, for example, of 1.7 V (vs. Ag/AgCl) for about 300 s.

In example embodiments, the individual VA-NCNTs of the catalytic layer 50 may be about 5 μm to about 15 μm long and may have outer diameters of approximately 20 nm to approximately 30 nm. In one example embodiment, the VA-NCNTs of the catalytic layer 50 may be about 8 μm long and may have outer diameters of approximately 25 nm. The width of the catalytic layer 50, controlled by the length of the individual VA-NCNTs prepared according to the embodiments disclosed above, is limited by the size of the furnace or other vessel used to grown the VA-NCNTs. It will be appreciated, therefore, that the nanotube dimensions described above are not intended to limit the catalytic layer 50 to any particular dimension, because the furnace or vessel used to grow the VA-NCNTs can be scaled up as desired to produce a catalytic layer 50 that is considerably thicker or covers a much larger portion of the outer surface 25 of the cathode body 20.

Example catalytic layers prepared as described above were analytically characterized. In general, the individual VA-NCNTs of the catalytic layers were found to exhibit a zigzag-like path along their length, thus slightly altering the individual VA-NCNTs from a straight cylindrical geometry. Without intent to be limited by theory, it is believed that the zigzag-like path is attributable to the integration of nitrogen into the graphitic structure of the nanotubes. The presence of structural nitrogen was confirmed by x-ray photoelectron spectroscopy (XPS). The aligned structure remained largely unchanged after the electrochemical purification, but some evidence of bundling was observed.

Figure 3:
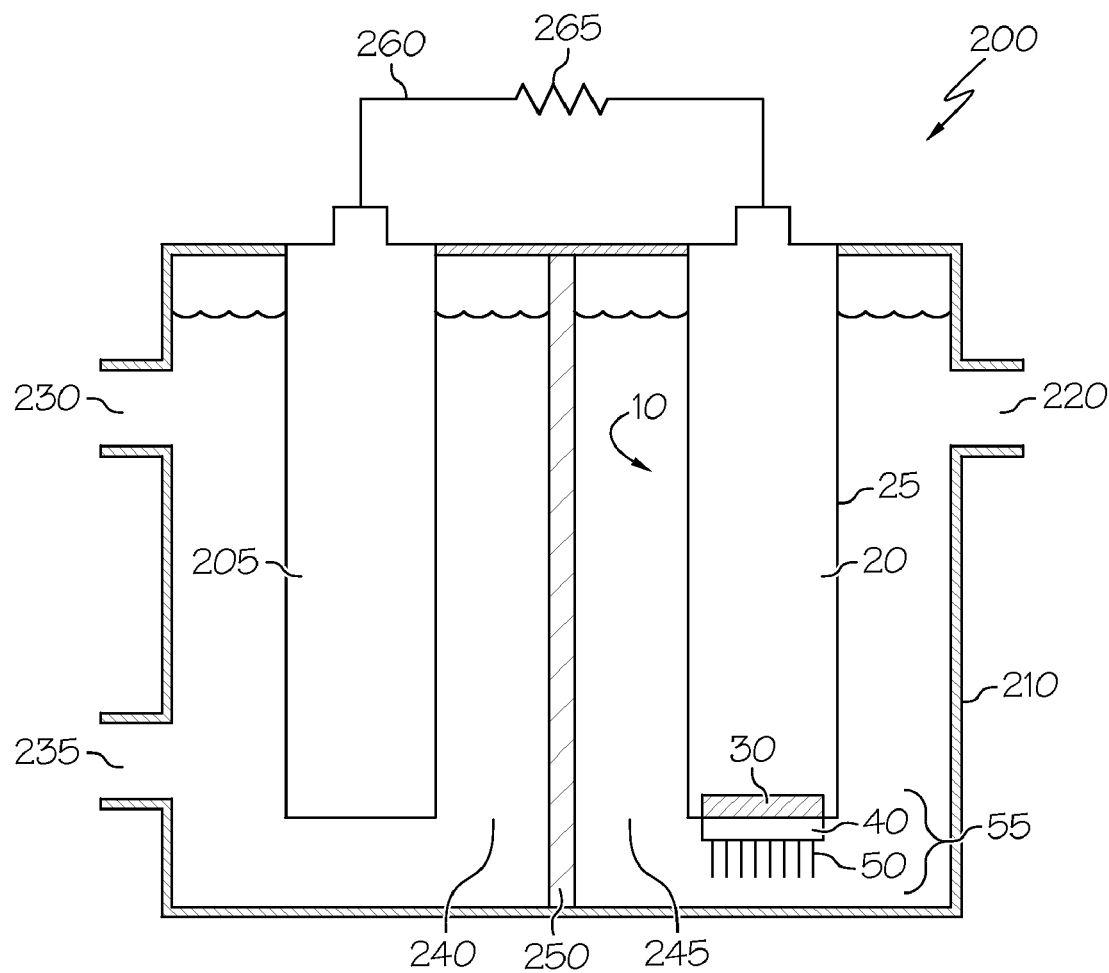
FIG. 3 is a cross-sectional plan view of an embodiment of a fuel cell comprising a fuel cell cathode having a catalytic layer of vertically-aligned nitrogen-doped carbon nanotubes.

Referring to FIG. 3, an example embodiment is shown of a fuel cell cathode 10 prepared as described according to one or more embodiments previously disclosed. The fuel cell 200 comprises a fuel cell body 210. The fuel cell body 210 may be any shape and may be formed of any material suitable for enclosing the electrochemical components of the fuel cell 200 itself. The fuel cell body 210 comprises an oxidant inlet 220 configured to fluidly couple the fuel cell body 210 to an oxidant source (not shown). The oxidant source may be any vessel suited to a desired application such as, for example, an oxygen tank of any shape, size, or configuration. The fuel cell body further comprises a fuel inlet 230 configured to fluidly couple the fuel cell body 210 to a fuel source (not shown). The fuel source also may be any vessel suited to a desired application. Examples of fuels suitable for introduction through the fuel inlet 230 include without limitation gas streams or liquid solutions comprising hydrogen, methanol, glucose, formaldehyde, or mixtures thereof. Thus, in example embodiments, the fuel cell 200 may be configured as a hydrogen fuel cell, as a glucose fuel cell, as a methanol fuel cell, or as a formaldehyde fuel cell.

The fuel cell body 210 further comprises an exhaust outlet 235, through which waste products such as water can be expelled from the fuel cell 200. The sizes, shapes, and configurations of the oxidant inlet 220, the fuel inlet 230, and the exhaust outlet 235 depicted in FIG. 3 will be understood as but one possible example among many. Each may be relocated anywhere on the fuel cell body 210, provided the applicable oxidant or fuel is still supplied to the fuel cell body 210 and the waste products are expelled from the fuel cell body 210.

The fuel cell 200 further comprises a fuel cell cathode 10 fluidly coupled to the oxidant inlet 220. A fuel cell anode 205 is fluidly coupled to the fuel inlet 230 and the exhaust outlet 235. Within the fuel cell body 210 and between the fuel cell cathode 10 and the fuel cell anode 205, a cathode electrolyte 245 and an anode electrolyte 240 are configured to permit flow of ions between the fuel cell cathode 10 and the fuel cell anode 205. Example configurations include, but are not limited to, at least partially immersing the fuel cell cathode 10 and the fuel cell anode 205 in liquid electrolytes (as shown), placing the fuel cell cathode 10 and the fuel cell anode 205 in physical contact with solid electrolytes (not shown), or both. Thus, the cathode electrolyte 245 and the anode electrolyte 240 may be liquids or solids and may have the same composition or different chemical compositions. In one example embodiment, both the cathode electrolyte 245 and the anode electrolyte 240 may contain hydroxyl ions, such that the fuel cell 200 as a whole would operate as an alkaline fuel cell.

An electrically insulating ion-permeable membrane 250 may be disposed within the fuel cell body 210 between the fuel cell cathode 10 and the fuel cell anode 205. The fuel cell anode 205 may comprise any suitable material known in the art for to be effective at reducing an selected fuel (for example, hydrogen), and the fuel cell anode 205 may be coated with a catalyst layer (not shown) selected from among catalysts effective for catalyzing the reduction of the fuel. It will be understood that the sizes, shapes, and configurations of the fuel cell cathode 10 and the fuel cell anode 205 are not limited to those shown in FIG. 3, but that the example embodiment is meant to depict the interrelationships of the various components of the fuel cell 200. The electrically insulating ion-permeable membrane 250 is configured to prevent flow of electrons between the fuel cell anode 205 and the fuel cell cathode 10 through one or both of the cathode electrolyte 245 and the anode electrolyte 240. Nevertheless, the ions involved in the selected chemistry of the fuel cell 200 can flow freely through the electrically insulating ion-permeable membrane 250. As such, the electrically insulating ion-permeable membrane 250 may be selected from any type of membrane suitable for fuel cells generally (for example, Nafion), in view of technical needs of the particular fuel cell 200. In one example, the electrically insulating ion-permeable membrane 250 is permeable to hydroxyl ions. It is foreseeable within the scope of these embodiments that fuel cell configurations may be possible, wherein the electrically-insulating ion-permeable membrane 250 is entirely optional.

The fuel cell 200 further comprises an external circuit 260 physically isolated from the cathode electrolyte 245 and the anode electrolyte 240. The external circuit 260 electrically couples the fuel cell anode 205 and the fuel cell cathode 10. The external circuit 260 may comprise an electrical load 265. In example embodiments, the electrical load 265 may comprise one or more electrical or mechanical device that can be powered with electricity generated by the fuel cell 200. In a further example embodiment, the electrical load 265 may comprise an electrical storage system (not shown), such as an electric battery.

The fuel cell cathode 10 comprises a cathode body 20 electrically coupled to the external circuit 260. The cathode body 20 has an outer surface 25. The cathode body 20 may have any desired shape, cross-section, or configuration and may be made of any suitable material. In some embodiments, the cathode body 20 may be a solid electric conductor, such as a metal, a conductive polymer, or glassy carbon. In further embodiments, the cathode body 20 may comprise a conductive or non-conductive shell (not shown) surrounding an electrically conductive core (not shown). In the embodiment shown in FIG. 3, the fuel cell cathode 10 comprises a contact portion 30 configured as a glassy carbon insert within the cathode body 20 and forming a portion of the outer surface 25 of the cathode body 20. The contact portion 30 may be electrically coupled to the cathode body 20 itself or, if the cathode body is non-conductive, to a conductor (not shown) extending through the cathode body 20. In another embodiment not shown, the contact portion 30 may be configured as a coating of glassy carbon covering up to a substantial entirety of the outer surface 25 of the cathode body 20 or, alternatively, up to a substantial entirety of the portion of the cathode body 20 that is in physical contact with the cathode electrolyte 245.

The fuel cell cathode 10 further comprises a supported nanotube array 55 attached to the contact portion 30 of the cathode body 20. FIG. 3 shows by means of illustration, not of limitation, that the supported nanotube array 55 is attached to only a portion of the outer surface of the cathode body 20, in particular to the contact portion 30 configured in FIG. 3 as a glassy carbon insert. As suitable for the desired application, the supported nanotube array 55 may be attached to and cover any amount of the cathode body 20. Thus, though FIG. 3 essentially depicts a supported nanotube array 55 covering only a tip of the cathode body 20, shown as cylindrical, the supported nanotube array 55 may instead cover, for example, a surface feature of a flat cathode body, or any amount up to a substantial entirety of a cathode body of any desired shape. In further embodiments not shown, the fuel cell cathode 10 may comprise multiple supported nanotube arrays, which may be contiguous or non-contiguous.

The supported nanotube array 55 comprises a binder layer 40, attached to the outer surface 25 of the cathode body 20, and a catalytic layer 50 supported by the binder layer 40. The catalytic layer 50 comprises a plurality of VA-NCNTs. In example embodiments, the individual VA-NCNTs of the plurality of VA-NCNTs may have lengths of approximately 5 µm to approximately 15 µm and outer diameters of approximately 20 nm to approximately 30 nm. The binder layer 40 is electrically conductive and thus electrically couples the catalytic layer 50 to the cathode body 20. The binder layer 40 may comprise any electrically conductive material suitable for supporting the VA-NCNT array of the catalytic layer 50 to the cathode body 20. In one embodiment, the binder layer 40 may comprise a conductive polymer such as, for example, a polystyrene.

The binder layer 40 may further comprise non-aligned carbon nanotubes that form a composite with a conductive polymer. In an example embodiment, the binder layer may comprise an electrically conductive composite of a polystyrene and nonaligned carbon nanotubes. The nonaligned carbon nanotubes may comprise a graphitic structure consisting of carbon atoms, or the nonaligned carbon nanotubes may be doped. In an example embodiment, at least a portion of the nonaligned carbon nanotubes are nitrogen-doped.

Example electrochemical cells comprising fuel cell cathodes as described above were constructed as prototypes to test the potential effectiveness of fuel cells comprising the fuel cell cathodes. As comparative examples, fuel cell cathodes were prepared analogous to the fuel cell cathodes described one or more embodiment above, but with catalytic layers comprising nonaligned nitrogen-doped carbon nanotubes (NA-NCNTs), nonaligned undoped carbon nanotubes (NA-CNT), or vertically-aligned undoped carbon nanotubes (VA-CNT) electrodes. The comparative fuel cell cathodes were prepared by depositing onto a substrate layers formed from corresponding nanotubes available from or derived from commercial sources, then proceeding through steps analogous to those of the example method 100 shown in FIG. 2. The commercially available, undoped carbon nanotubes used for the comparative examples had an average diameter of 10-30 nm and were purchased from Shenzhen Nanotech Port Co., Ltd. (Shenzhen, China). The NA-NCNTs were acquired by sonicating the VA-NCNTs, prepared as described above, in double-distilled water for 1 hour, collecting the nanotubes through centrifugation, and drying them in a vacuum oven (150° C.). All other chemicals can be purchased from Sigma-Aldrich and used without any further purification. As a basis for comparison with noble-metal catalysts used in prior-art fuel cells, a comparative fuel cell cathode was constructed from platinum-loaded carbon without addition of any carbon nanotubes. The platinum-loaded carbon electrodes (Pt—C, C2-20, 20% HP Pt on Vulcan XC-72R) were purchased from E-TEK Division, PEMEAS Fuel Cell Technologies.

Electrochemical measurements were performed using a computer-controlled potentiostat (CHI 760C, CH Instrument, USA) with a typical three-electrode cell equipped with all necessary gas flow systems. Working electrodes comprising catalytic layers of VA-NCNTs, NA-NCNTs, VA-CCNTs, NA-CCNTs, or Pt—C, all supported on a glassy carbon tip, were measured using an Ag/AgCl (3 M KCl-filled) reference electrode, and an platinum wire counterelectrode. An aqueous solution of KOH (0.1 M) was used as the electrolyte. Rotating ring-disk electrode (RRDE) voltammograms were collected with a modified glassy-carbon disk electrode and a platinum ring electrode (9-mm outer diameter and 6-mm inner diameter). The collection efficiency of the rotating ring-disk electrode was determined to be 0.30 with a $Fe(CN)_6^{4-/3-}$ probe. RRDE experiments were carried out using a MSRX speed controller (Pine Instrument Co. Ltd.) and the CHI 760C bipotentiostat. Potential-sweep electrolysis was performed at the modified glassy-carbon disk electrode while the Pt ring electrode was polarized at +0.50 V so as to oxidize any $HO_2^-$ intermediate that might be generated from the disk electrode. All the experiments were conducted at room temperature (25±1° C.).

Scanning electron microscopy (SEM) and transmission electron microscopy (TEM) images were recorded on a Hitachi S4800-F high-resolution SEM and H-7600 TEM unit (Hitachi, Japan), respectively. Raman spectra were measured using an in Via micro-Raman spectrometer (Renishaw) with 785-nm laser. X-ray photoelectron spectroscopic (XPS) measurements were performed on a VG Microtech ESCA 2000 using a monochromic Al x-ray source. The nominal x-ray beam diameter was 600-µm. Thermogravimetric analyses were performed on a TGA Q500 unit (TA).

XPS survey, high-resolution $C_{1s}$, and high-resolution $N_{1s}$ spectra of the VA-NCNTs were measured before and after the electrochemical purification. The XPS survey spectrum of the as-grown VA-NCNT array showed a $C_{1s}$ peak at 285 eV and an $O_{1s}$ peak at 531 eV, presumably arising from physically adsorbed oxygen-containing species. Signals for Fe at 55 eV and 707 eV were attributable to residual iron from the pyrolysis of FePc. A peak at 399 eV was attributed to pyridinic-like groups, and a peak seen at 401 eV was consistent with pyrrolic-like groups. A corresponding XPS survey spectrum for an electrochemically purified VA-NCNT array showed similar peaks to the spectrum of the non-purified array, but a much stronger $O_{1s}$ peak was observed, along with reduced intensities of the Fe signals. It is believed that these features are consistent with the removal of residual iron particles and the generation of certain oxygen-containing surface groups by electrochemical purification.

The high-resolution $C_{1s}$ spectrum of the as-grown VA-NCNT array showed a relatively narrow peak for graphitic carbon at about 285 eV, whereas the corresponding high-resolution $C_{1s}$ spectrum for the electrochemically purified VA-NCNT array showed three peak components at 284.6 eV, 286.2 eV, and 288.5 eV, respectively assignable to the C—C or C—H, C—O, and O=C—O components.

The XPS survey and high-resolution $C_{1s}$ spectra for the VA-NCNT array after the ORR showed similar features as those measured before the ORR. However, the corresponding $N_{1s}$ spectra showed noticeable changes caused by the ORR. For example, the pyridine peak at 399 eV was suppressed, and the pyrrolic peak at 401 eV relatively increased. Thus, it is theorized that the high ORR catalytic activity of the NCNTs may originate from the active sites of pyrrolic nitrogens. The oxygen-containing surface groups seemed to be electrochemically inactive toward the ORR.

The electrochemical purification was confirmed by voltammetric responses of the VA-NCNT electrode before and after electrochemical oxidation. Before the cyclic voltammetry (CV) measurements, the unpurified VA-NCNT/GC electrodes on glassy carbon (VA-NCNT/GC) were repeatedly potentiodynamically swept from +0.2 V to −1.2 V in an Ar-protected, 0.1 M KOH solution until a steady voltammogram curve was obtained. A CV of an unpurified VA-NCNT/GC electrode was measured in 0.1 M KOH solution under argon protection. This sample exhibited two well-defined peaks at potentials of −1.0 V and −0.65 V, believed to arise from redox reactions associated with Fe residues. In contrast, the corresponding voltammetric response for the same VA-NCNT/GC electrode after electrochemical purification showed a featureless curve at the same potentials. This difference strongly suggests that the iron catalyst residues were mostly or completely removed by the electrochemical oxidation.

Thermogravimetric analyses (TGA, TA500) were performed on samples of the as-synthesized (unpurified) VA-NCNTs by mechanically scratching nanotubes for from several pieces of quartz plates on which the nanotubes has been grown. In one sample, approximately 12 wt. % of orange-colored residue was observed, even after the sample had been heated up to about 1000° C. The residue likely was attributable the presence of Fe that had been thermally oxidized to $Fe_2O_3$. Corresponding TGA measurements were performed for the electrochemically purified N-doped nanotubes. First, VA-NCNTs were mechanically scratched from several VA-NCNT arrays to destroy the vertical alignment and provide nonaligned nitrogen-doped carbon nanotubes (NA-NCNTs). The NA-NCNTs were electrochemically oxidized in an aqueous solution of $H_2SO_4$ (0.5 M) at a potential of 1.7 V (vs. Ag/AgCl) for 300 s. The electrochemically purified NCNTs were then washed repeatedly with an excess of pure water and were dried overnight in vacuum. The purified NA-NCNT sample showed almost no residue above 550° C., indicating consistently with the XPS measurement suggesting that the electrochemical purification completely removed Fe residues.

The cyclic voltammograms of VA-NCNT/GC electrodes in an Ar-protected 0.1 M KOH solution in the presence and absence of 2.0 M methanol were nearly identical to those of the same electrode in the same electrolyte, regardless whether the electrodes were saturated by CO. This indicated that the VA-NCNT electrodes possess an excellent tolerance to methanol crossover and an excellent resistance to CO poisoning effects.

Further CVs were measured to compare oxygen reduction at the VA-NCNT/GC before and after electrochemical purification in 0.1 M KOH solution. Unlike conventional carbon electrodes, a cathodic process with a rather high reduction potential (i.e., lower overpotential) of about −0.20 V was observed for the ORR in both the un-purified and the electrochemically-purified VA-NCNT/GC electrodes.

To gain further insight into the ORR electrochemical processes, rotating-ring disk electrode (RRDE) voltammograms were performed on (1) nitrogen-free nonaligned carbon nanotubes supported by a glassy carbon electrode (NA-CNT/GC), commercially available platinum-loaded carbon (C2-20, 20% HP Pt on Vulcan XC-72R; E-TEK Division, PEMEAS Fuel Cell Technologies) supported by a glassy carbon electrode (Pt—C/GC), and glassy-carbon-supported nonaligned nitrogen-doped carbon nanotubes (NA-NCNT/GC) in air-saturated 0.1 M KOH electrolyte. The corresponding amperometric responses for the oxidation of hydrogen peroxide was measured using a Pt ring electrode at a potential of 0.5 V.

The NA-CCNT/GC electrode showed a two-step process for ORR with onset potentiala of about −0.35 V and −0.80 V. The first sharp step over −0.35 V may be attributable to a two-electron process involving a reduction of $O_2$ to $HO_2^-$. This was confirmed from a substantially concomitant increase in oxidation current observed at the ring electrode over about −0.2 V to −0.4 V. A subsequent gradual decrease in the ring current was observed and was believed to correspond to the reduction of $HO_2^-$ generated at the first step to $HO^-$.

Unlike the NA-CNT/GC electrode, the NA-NCNT/GC electrode exhibited a one-step process for the ORR. Furthermore, the NA-NCNT/GC electrode showed a steady-state diffusion current almost double that of the NA-CNT/GC electrode. As with the Pt—C/GC electrode, the observed one-step process suggests a four-electron pathway for the ORR at the NA-NCNT/GC electrode. A four-electron pathway was also supported by negligible current for $HO_2^-$ oxidation at the Pt ring electrode. The transferred electron numbers (n) per oxygen molecule involved in the ORR were calculated from Equation 1 to be 1.8 for the NA-CCNT/GC electrode (at the potential of −0.40 V) and 3.9 for the NA-NCNT/GC electrode (at the potential of −0.30 V).

$$n = 4I_D/(I_D + I_R/N) \quad (1)$$

where, N=0.3 is the collection efficiency, $I_D$ is the faradic disk current, and $I_R$ is the faradic ring current.

Steady-state voltammograms were measured for Pt—C/GC, VA-CNT/GC, and VA-NCNT/GC electrodes in the air-saturated 0.1 M KOH electrolyte. Though the half-wave potentials for ORR at the NA-NCNT and VA-NCNT electrodes were comparable to that at the Pt—C/GC electrode (−0.1 V), a substantially enhanced steady-state diffusion current was observed over a large potential range for the VA-NCNT electrodes with respect to the Pt—C/GC electrode. These CV measurements indicated superior performance of the VA-NCNT electrode over the Pt—C/GC electrode for the ORR in an alkaline solution.

Compared with the NA-NCNT electrode, the observed superior electrocatalytic performance of the VA-NCNT/GC electrode may be attributable to a more well-defined, larger surface area of the VA-NCNT electrode. In the VA-NCNT electrode, it is believed that essentially all of the nanotube top-ends define a single plane at the interface of the aligned nanotube electrode and the electrolyte solution. This, in turn, may further facilitate electrolyte/reactant diffusion. Similar current enhancement by the alignment structure was observed also for the VA-CNT electrode with respect to its nonaligned counterpart (NA-CNT), albeit with a relatively small effect and a very high overpotential. The similarly shaped steady-state voltammograms of the aligned nanotube electrodes and their respective non-aligned counterparts may indicate that the electrochemical mechanism for the ORR is independent on the alignment of the nanotubes. But compared to the VA-CNT and NA-CNT electrodes, stronger currents observed for the VA-NCNT and NA-NCNT electrodes over a large potential window, combined with the lower overpotentials of the nitrogen-doped electrodes, indicate that the presence of nitrogen atoms coordinated in pyridinic units, pyrrolic units, or both, does in fact play a crucial role in regulating electrocatalytic activities for the ORR.

To investigate the temporal stability of the VA-NCNT/GC electrode toward ORR, continuous potential cycling was performed between +0.2 V and −1.2 V for the VA-NCNT/GC electrode. A Pt—C/GC was similarly measured as a comparative example. The potential cycling was performed for each electrode in either argon-protected or air-saturated 0.1 M KOH under ambient conditions (25° C.±1° C.) for about 100,000 cycles. Scan rates were approximately 100 mV s$^{-1}$. Electrocatalytic activities of the electrodes were compared before and after the potential cycling.

During potential cycling of the Pt—C/GC electrode, the oxidation or reduction of Pt was observed from a peak not attributable to the ORR. It is believed that the continuous potential cycling of the Pt—C/GC may result in migration or aggregation of Pt nanoparticles from the electrode, thereby decreasing the specific catalytic activity. In contrast, the VA-NCNT/GC electrode showed almost identical voltammetric responses before and after the continuous potential cycling in both the argon-protected and air-saturated 0.1 M KOH electrolyte. These results clearly indicate excellent long-term operation stability with a superior ORR electrocatalytic activity of the VA-NCNT/GC electrode, as compared with a commercial Pt—C/Gc electrode.

The VA-NCNT/GC electrode was further tested to investigate loss of catalytic activity under conditions analogous to crossover of fuel molecules (e.g., methanol) or to poisoning by molecules such as CO. In a direct methanol fuel cell, for example, the methanol oxidation on the anode is a competitive reaction to the oxygen reduction at the cathode. Because the oxidation of fuels on noble-metal electrodes often commences at a potential lower than that of the ORR under the working conditions, methanol crossover from the anode to the cathode, if not eliminated, can diminish the cathodic performance through a depolarising effect. Furthermore, the whole fuel-cell system can be paralysed against ORR in some instances if the cathode catalyst is exposed to CO-like species generated as intermediates of the methanol oxidation at the cathode. This effect is known as "poisoning," and is a known disadvantage of Pt-based fuel cell cathode catalysts.

Figure 4A:
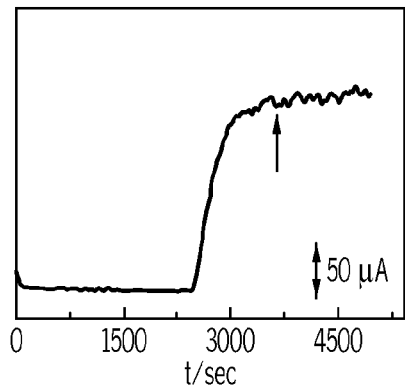
FIG. 4A is a graph of i-t chronoamperometric response of a VA-NCNT/GC electrode during sequential exposures to air, glucose, methanol, and formaldehyde.
Figure 4B:
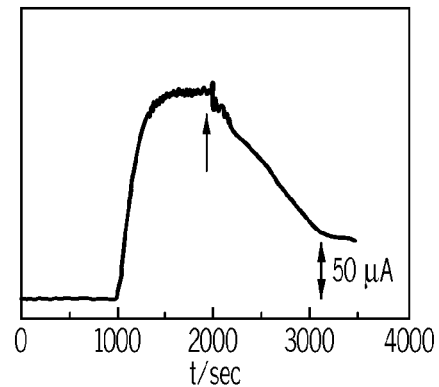
FIG. 4B is a graph of i-t chronoamperometric response of a Pt—C/GC electrode during an exposure of the electrode to methanol.

Referring to FIGS. 4A and 4B, to examine the possible crossover effect, the electrocatalytic selectivity of the VA-NCNT/GC electrode was measured against the electrooxidation of various commonly used fuel molecules, including hydrogen gas, glucose, methanol, and formaldehyde. FIG. 4A illustrates the i-t chronoamperometric responses obtained at the VA-NCNT/GC electrode at −0.25 V in 0.1 M KOH under magnetic stirring (1000 rpm, MR 3001 K, Heidolph) and Ar-protection over 0-2400 s. The arrow indicates the point of time at which all of (1) air, (2) 3.0 M glucose, (3) 3.0 M methanol, and (4) 3.0 M formaldehyde were sequentially introduced into an electrochemical cell comprising a VA-NCNT electrode as the cathode. For a comparison, the corresponding i-t chronoamperometric response for a Pt—C/GC cathode is provided as FIG. 4B.

The graph in FIG. 4B shows that the current of the electrochemical call with a Pt—C/GC cathode sharply decreased when 3.0 M methanol was introduced. However, as evident from the graph shown in FIG. 4A, a strong and stable amperometric response from the oxygen reduction on the VA-NCNT/GC cathode remained unchanged, even after the sequential addition of hydrogen gas, glucose, methanol, and formaldehyde. This clearly indicates a high selectivity of the VA-NCNT/GC electrode toward the ORR. Such a remarkably good tolerance to crossover effect for the VA-NCNT/GC electrode can be attributed to the much lower ORR potential than the potential required for oxidation of fuel molecules.

The results shown in FIGS. 4A and 4B were consistent with cathodic polarization measurements made in the presence and absence of 3.0 M methanol. An i-t chronoamperometric response was obtained at the Pt—C/GC electrode with the addition of 3.0 M methanol after exposure to air at 1000 s under the same condition as in FIG. 4B for comparison. Half-cell I-V polarization curves for $O_2$ reduction at the Pt—C/GC and VA-NCNT/GC electrodes were measured in air-saturated 0.1 M KOH in the absence and presence of 3.0 M methanol. The CO-poisoning effect on the i-t Chronoamperometric response thereby could be investigated for the Pt—C/GC and VA-NCNT/GC electrodes. During the test, 55 mL/min of CO gas was introduced into the $O_2$ flow with a flow rate 550 mL/min, and then the mixture gas of ~9% CO (v/v) was introduced into the electrochemical cell. For the Pt—C/GC electrode in air-saturated 0.1 M KOH, a significant loss in the open-circuit potential (about 110 mV) and the steady-state output potential (150 mV) were observed after adding 3.0 M methanol was added. In contrast, the corresponding effect on the VA-NCNT/GC electrode was almost negligible.

Figure 4C:
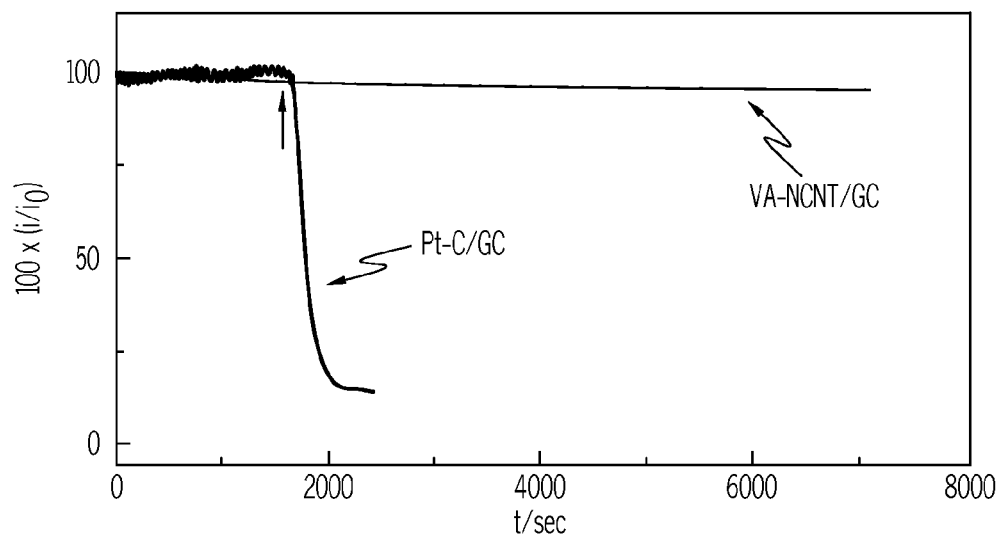
FIG. 4C is a graph comparing resistance of Pt—C/GC electrodes and VA-NCNT/GC electrodes to CO poisoning.

A strong resistance of the VA-NCNT/GC electrode to poisoning by CO, particularly as compared with the Pt—C/GC electrode, is evident from the graph shown in FIG. 4C. The arrow in FIG. 4C indicates the point in time at which 55 mL/min of CO gas was first introduced into the $O_2$ flow with a flow rate 550 mL/min, whereupon the mixture gas of ~9% CO (v/v) was introduced into the electrochemical cell. The flat curve shown in FIG. 4C shows that the VA-NCNT/GC electrode was insensitive to CO poisoning, even at such a high concentration of CO as nearly 10% CO in air. In contrast, the Pt—C/GC electrode was rapidly poisoned under the same conditions. Furthermore, the lack of CO poisoning in the VA-NCNT/GC is consistent with an electrode effectively free of residual iron particles from the initial pyrolysis of the nanotubes, because residual iron would be expected to be readily poisoned by CO. Without intent to be limited by theory, it is believed that the marked increase in resistance to CO poisoning is directly attributable to the non-metal VA-NCNT electrode catalytic layer. This illustrates that the VA-NCNTs are superior to the Pt—C/GC electrode for fuel cell applications, especially in fuel cell applications where the presence of CO is expected.

In summary, a new class of metal-free fuel cell cathodes for ORR, methods for their fabrication, and fuel cells comprising the cathodes, have been described. The cathodes comprise a catalytic layer of vertically-aligned nitrogen-doped carbon nanotubes. The ORR on the cathodes proceeds via a four-electron pathway in alkaline fuel cells. The VA-NCNT cathodes showed ORR performance superior to that of commercially available platinum electrodes with respect to electrocatalytic activity, long-term operation stability, and tolerance to crossover effects. Without intent to be limited by theory, it is believed that the incorporation of electron-accepting nitrogen atoms in the conjugated nanotube carbon plane facilitates the ORR on the NCNT electrodes during electrochemical cycling, as absorbed $O_2$ molecules reduce the charge-deficient carbon atoms around the electron-rich nitrogen atoms and then reoxidize the reduced carbon atoms to their preferred oxidized states. It will be appreciated that nitrogen doping as described herein could be applied to the design and development of various other metal-free efficient ORR catalysts for fuel cells and other applications.

As the number of industrial-scale facilities for the relatively low-cost production of carbon nanotubes continues to grow, the price of carbon nanotubes is expected to further decrease significantly in the coming years. The bottleneck in the technological development of low-cost and high-performance fuel cells can be resolved by replacing expensive noble metal electrocatalysts with metal-free carbon nanotube catalytic layers.

It is noted that no use herein of terms like "preferably," "commonly," and "typically" are intended to limit the scope of the claimed disclosure or to imply that certain features are critical, essential, or even important to the structure or function of the claimed disclosure. Rather, these terms are merely intended to highlight alternative or additional features that may or may not be utilized in a particular embodiment of the present disclosure.

For the purposes of describing and defining the present disclosure it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

What is claimed is:

1. A fuel cell cathode comprising:
  a cathode body;
  a binder layer attached to a contact portion of an outer surface of the cathode body, the binder layer comprising a composite of a conductive polymer and nonaligned carbon nanotubes; and
  a catalytic layer supported by the binder layer, the catalytic layer comprising a plurality of vertically-aligned nitrogen-doped carbon nanotubes.

2. The fuel cell cathode of claim 1, wherein the contact portion comprises glassy carbon.

3. The fuel cell cathode of claim 2, wherein the nonaligned carbon nanotubes are nitrogen-doped carbon nanotubes.

4. The fuel cell cathode of claim 1, wherein the conductive polymer comprises a polystyrene.

5. A method of fabricating a fuel cell cathode, the method comprising:
  providing a substrate comprising an array of vertically-aligned nitrogen-doped carbon nanotubes bound to a surface of the substrate;
  coating a top surface of the array with a binder layer comprising a composite of conductive polystyrene and nonaligned nitrogen-doped carbon nanotubes;
  etching a free surface of the binder layer to expose within an etched free surface a portion of the nonaligned nitrogen-doped carbon nanotubes in the composite;
  removing the substrate to produce a free-standing film comprising the array of vertically-aligned nitrogen-doped carbon nanotubes supported by binder layer;
  attaching the etched free surface of the free-standing film to a contact portion of an outer surface of a cathode body, the contact portion comprising glassy carbon.

6. The method of claim 5, wherein the providing the substrate further comprises:
  pyrolyzing a metalorganic compound in the presence of the substrate to form a plurality of carbon nanotubes on the surface of the substrate;
  integrating nitrogen into the graphitic structure of the plurality of carbon nanotubes; and
  removing residual metal catalyst particles by electrochemical oxidation.

7. The method of claim 6 wherein the metalorganic compound is an iron (II) phthalocyanine.

8. The method of claim 7, wherein the pyrolyzing is performed in the presence of ammonia vapor.

9. The method of claim 5, wherein the coating the top surface of the array with the binder layer further comprises heating the substrate to cause a controlled infiltration of the binder layer into the array.

10. The method of claim 5, further comprising purifying the fuel cell cathode after the attaching of the etched free surface to the cathode body.

11. The method of claim 10, wherein the purifying comprises electrochemically oxidizing the fuel cell cathode.

12. A fuel cell comprising:
  a fuel cell body;
  an oxidant inlet configured to fluidly couple the fuel cell body to an oxidant source;
  a fuel inlet configured to fluidly couple the fuel cell body to a fuel source;
  an exhaust outlet;
  a fuel cell cathode fluidly coupled to the oxidant inlet;
  a fuel cell anode fluidly coupled to the fuel inlet and the exhaust outlet;
  at least one electrolyte configured to enable flow of ions between the fuel cell cathode and the fuel cell anode;
  an electrically insulating ion-permeable membrane disposed within the fuel cell body between the fuel cell cathode and the fuel cell anode, the electrically insulating membrane configured to prevent flow of electrons between the fuel cell anode and the fuel cell cathode through the electrolyte; and
  an external circuit isolated from the electrolyte and electrically coupling the fuel cell anode and the fuel cell cathode,
  wherein the fuel cell cathode comprises:
    a cathode body electrically coupled to the external circuit;
    a binder layer attached to a contact portion of an outer surface of the cathode body, the binder layer comprising a composite of a conductive polymer and nonaligned carbon nanotubes; and
    a catalytic layer electrically coupled to the electrolyte and the cathode body, the catalytic layer comprising a plurality of vertically-aligned nitrogen-doped carbon nanotubes supported by the binder layer.

13. The fuel cell of claim 12, wherein the contact portion comprises glassy carbon.

14. The fuel cell of claim 12, wherein the nonaligned carbon nanotubes are nitrogen-doped carbon nanotubes.

15. The fuel cell of claim 12, wherein the conductive polymer comprises a polystyrene.

16. The fuel cell of claim 12, wherein the electrolyte is an alkaline material and the electrically insulating ion-permeable membrane is permeable to hydroxyl ions.

17. The fuel cell of claim 12, wherein the individual vertically-aligned nitrogen-doped carbon nanotubes of the plurality of vertically-aligned nitrogen-doped carbon nanotubes have lengths of approximately 5 μm to approximately 15 μm.

18. The fuel cell of claim 12, wherein the individual vertically-aligned nitrogen-doped carbon nanotubes of the plurality of vertically-aligned nitrogen-doped carbon nanotubes have outer diameters of approximately 20 nm to approximately 30 nm.

19. The fuel cell of claim 12, wherein the fuel cell is a hydrogen gas fuel cell, a glucose fuel cell, a methanol fuel cell, or a formaldehyde fuel cell.

20. The fuel cell of claim 19, wherein the fuel cell is a hydrogen gas fuel cell.

* * * * *